(12) United States Patent
Sakr et al.

(10) Patent No.: US 8,745,290 B2
(45) Date of Patent: Jun. 3, 2014

(54) MULTI-MODEM DEVICE

(75) Inventors: Hisham Atef Sakr, Vancouver (CA); Jared Go, Santa Clara, CA (US); Aron B. Hall, Palo Alto, CA (US)

(73) Assignee: Hobnob, Inc., Palo Alto, CA (US)

( * ) Notice: Subject to any disclaimer, the term of this patent is extended or adjusted under 35 U.S.C. 154(b) by 0 days.

(21) Appl. No.: 13/609,022

(22) Filed: Sep. 10, 2012

(65) Prior Publication Data

US 2014/0075057 A1  Mar. 13, 2014

(51) Int. Cl.
*H04L 5/04* (2006.01)

(52) U.S. Cl.
USPC .............................. 710/36; 370/211; 375/222

(58) Field of Classification Search
CPC .................................................... H04W 88/08
USPC ............ 455/13.4; 710/63; 375/222; 370/211
See application file for complete search history.

(56) References Cited

U.S. PATENT DOCUMENTS

| 6,510,229 | B1* | 1/2003 | Geile ........................... 380/235 |
| 2008/0192721 | A1* | 8/2008 | Pernu et al. .................. 370/345 |
| 2010/0085951 | A1* | 4/2010 | Pernu et al. .................. 370/338 |
| 2012/0033718 | A1* | 2/2012 | Kauffman et al. ............ 375/222 |
| 2012/0088470 | A1* | 4/2012 | Raleigh ........................ 455/406 |
| 2012/0214441 | A1* | 8/2012 | Raleigh ........................ 455/406 |
| 2012/0263033 | A1* | 10/2012 | Kalla et al. ................... 370/221 |
| 2012/0289291 | A1* | 11/2012 | Moran et al. ................. 455/566 |
| 2012/0327172 | A1* | 12/2012 | El-Saban et al. ........... 348/14.02 |
| 2013/0022095 | A1* | 1/2013 | Pesola et al. ................. 375/222 |
| 2013/0308690 | A1* | 11/2013 | Kalla ............................ 375/222 |
| 2013/0332720 | A1 | 12/2013 | Gupta et al. |

* cited by examiner

*Primary Examiner* — Ernest Unelus
(74) *Attorney, Agent, or Firm* — Van Pelt, Yi & James LLP

(57) ABSTRACT

A multi-modem device is disclosed. The multi-modem device includes a housing. Included within the housing is a plurality of modems, wherein the modems send and receive data along a common data bus. The multi-modem device further includes an interface that provides a connection that enables the modems to communicate with a computer, wherein each of the modems is made available to the computer so that the modems may be selected either individually or in parallel to provide one or more communication links to the computer.

19 Claims, 7 Drawing Sheets

MULTI-MODEM DEVICE

BACKGROUND OF THE INVENTION

USB modems are available to mobile broadband users to connect to the Internet. However, because a single USB modem is typically tied to a single wireless carrier, a user who wishes to have Internet access through multiple wireless carriers must purchase separate USB modems from each of the wireless carriers and carry them when they travel. This can be inconvenient. There is a need for an improved broadband connection device.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An RF Pack is disclosed. In some embodiments, an RF Pack comprises a multi-modem device included within the same housing. In some embodiments, the multiple modems are mounted on a single circuit board and can send and receive data along a common local data bus. In some embodiments, the multiple modems are operated either individually or in parallel to provide data communication links and mobile network (e.g., Internet) access to a device.

Figure 1:
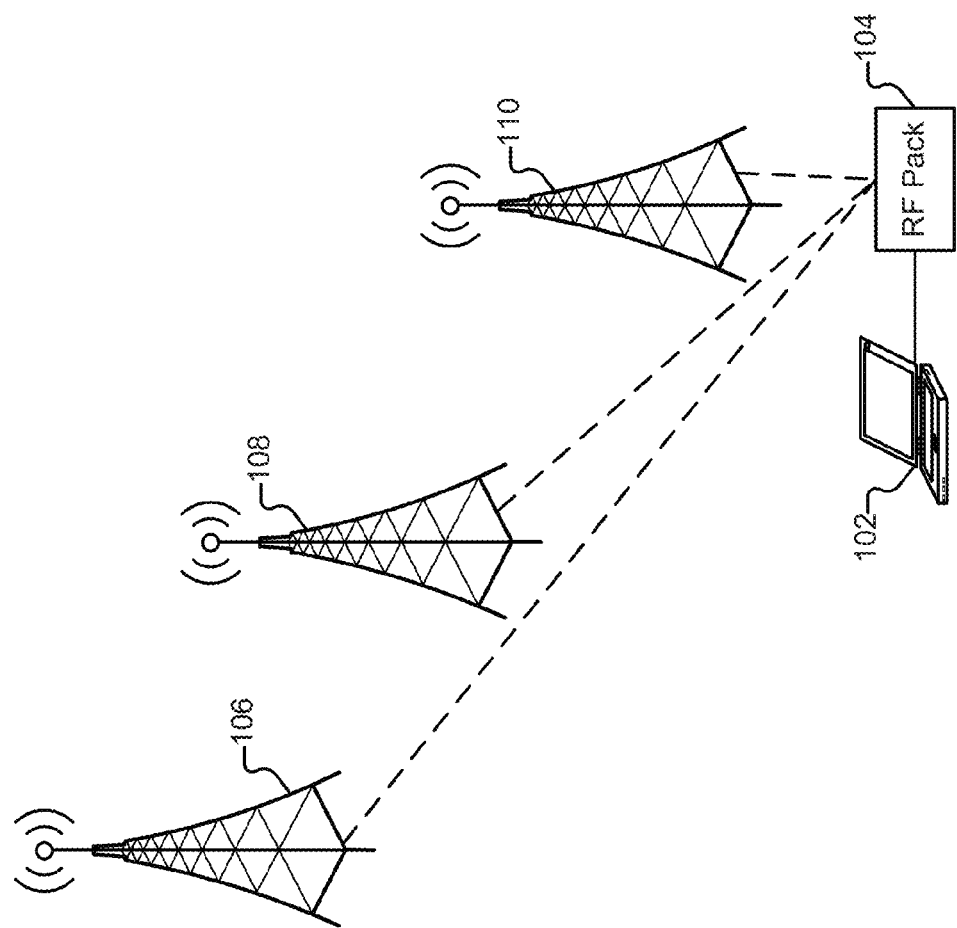
FIG. 1 is a diagram illustrating an embodiment of an environment in which an RF Pack is used.

FIG. 1 is a diagram illustrating an embodiment of an environment in which an RF Pack is used. In the example shown, host computer system 102 is a laptop computer. In various embodiments, host system 102 is a smartphone, tablet, desktop personal computer, or any other appropriate host system. Host system 102 is connected to RF Pack 104. In some embodiments, host system 102 is connected to RF Pack 104 via a wired connection (e.g., via USB, Thunderbolt, Firewire, interface, etc.). In various embodiments, the wired connection provides communication, power supply, etc. between host system 102 and RF Pack 104. In some embodiments, RF Pack 104 is portable, such that a user may transport RF Pack 104 from one location to another. For example, in various embodiments the RF Pack includes a router and communicates wirelessly with host system 102. The RF Pack can also take other forms, such as by being incorporated into an expansion card insertable into host system 102 (whether as an internal or external) card.

In various embodiments, host system 202 has installed applications and drivers (e.g., modem drivers) to enable communication with and control of the RF Pack. RF Pack 104 is in turn configured to communicate with wireless carriers 106, 108, and 110. In some embodiments wireless carriers 106, 108, and 110 are telecommunications carriers (i.e., providers of telecommunications services such as telephony and data communications access), such as Verizon, AT&T, T-mobile, Sprint, etc. The carriers can be associated with different geographical locations (e.g., Verizon in U.S., Orange in UK, etc.). In various embodiments, RF Pack 104 supports various wireless formats. For example, RF Pack 104 can communicate with carrier 106 via GPRS or EDGE, communicate with carrier 108 via 3G/4G(LTE), and communicate with carrier 110 via WiMax.

Figure 2:
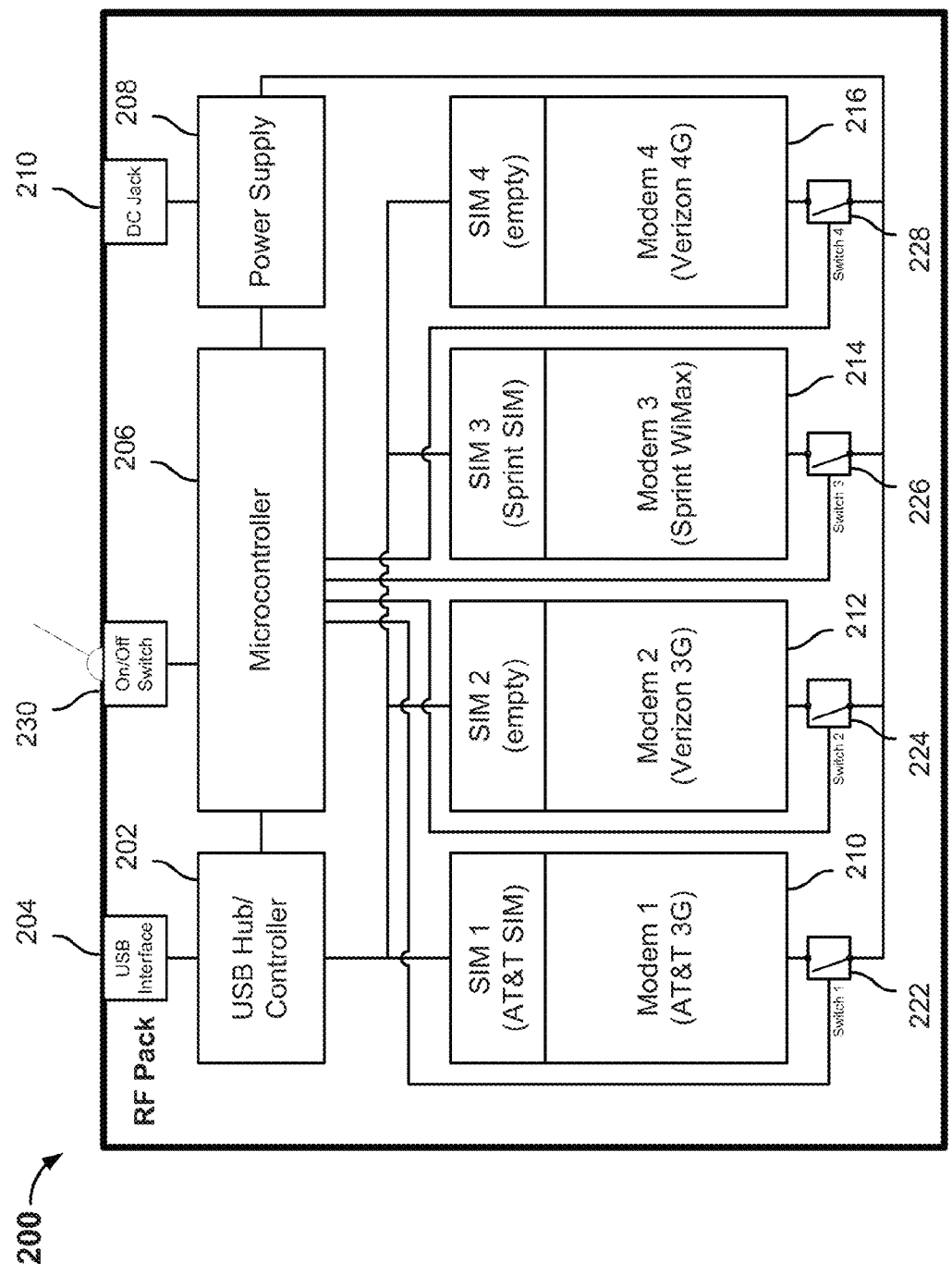
FIG. 2 is a schematic diagram illustrating an embodiment of an RF Pack.

FIG. 2 is a schematic diagram illustrating an embodiment of an RF Pack. In the example shown, RF Pack 200 includes USB hub/controller 202, USB interface 204, microcontroller 206, power supply 208, and DC Jack 210. RF Pack 200 also includes modems 210, 212, 214, 216 (and corresponding SIM cardholders and power cutoff switches 218, 220, 222, 224) and RF Pack on/off switch 230. In some embodiments, the componentry included in the RF Pack is included within the same housing.

In the example shown in FIG. 2, four modems (222, 224, 226, and 228) are included in RF Pack 200. However, other numbers of modems can be included in RF Pack 200, including just one. In some embodiments, modem slots/holders are included in the RF Pack, allowing for modems to be swapped in and out of RF Pack 200. For example, if a user of an RF Pack were to travel internationally, the user can switch out some or all of the modems currently included in the RF Pack and plug in new modems associated with carriers in the countries they are traveling to. As shown, all slots are populated, but need not be.

In some embodiments, modems 210, 212, 214, and 216 are mobile broadband modems (e.g., cellular modems) and/or wireless data modems configured to allow network (e.g., Internet) access via mobile broadband communication links (e.g., provided by wireless telecommunications carriers). The modems can include antennas, baseband transceivers, front-end circuitry, or any other appropriate componentry. In some embodiments, components among the modems are shared. For example, antennas can be shared, with power combiners/dividers used to isolate signals, preventing them from interfering with each other. Other componentry, such as baseband processors can be shared while multiplexers may be added (e.g., to allow for multiplexing of incoming signals that are to be processed by the same component). The modems can also optionally include integrated GPS (global positioning system) modules, or RF Pack 200 can be configured to include a standalone GPS module. In some embodiments, each modem slot is associated with a corresponding SIM (subscriber identity module) cardholder so that SIM cards can be inserted for use with modems associated with wireless carriers using standards such as GSM (e.g., AT&T) that use SIM cards. For wireless carriers such as Verizon (using CDMA) that do not require the use of SIM cards, the SIM cardholders corresponding to those modems can be left empty while the corresponding modem slot is populated. Other RF Pack configurations are possible.

In the example shown, modem 1 (210), modem 2 (212), and modem 3 (214) are each associated with different wireless formats (3G, 4G, WiMax) and different wireless carriers (AT&T, Verizon, Sprint). Modems 2 (212) and 4 (216) are associated with the same carrier (Verizon) but operate using different wireless formats (4G/3G). Other configurations and combinations of modems with different wireless formats/carriers are possible. For example, if a user of RF Pack 200 were visiting the UK, a modem/SIM module could be removed and the slot/holder populated with a modemSIM of a UK wireless carrier (e.g., Orange).

USB hub 202 is configured to provide a common data bus for modems 1 (210), 2 (212), 3 (214), and 4 (216) to send and receive data along. In some embodiments, USB hub 202 and modems 210, 212, 214, and 216 are collocated and mounted on a single circuit board. For purposes of illustration, embodiments employing USB interfaces are described in detail below. Other interfaces such as Thunderbolt, Firewire, etc. can also be used. USB hub 202 includes a USB hub controller IC (integrated circuitry) that is configured to manage USB hub 202. USB hub 202 is configured to consolidate the multiple modems into a single hub to allow for the modems to be made available as devices to a host system, such as host system laptop 102 via a single upstream port (USB interface/port 204). A USB cable can be used to connect RF Pack 200 to a host system via USB interface/port 204 on RF Pack 200 and a USB host port on the host system. In some embodiments, power is supplied (e.g., from host system 102) to RF Pack 200 via USB port 204. In some embodiments, the modem devices connected to the USB hub can be selected individually or in parallel by the host system for use. For example, each modem connected to the USB hub can be recognized as an individual device by a host laptop, while the modems can be operated simultaneously in parallel with their throughput and communication links aggregated such that the total bandwidth of all of the modems is available for data communication.

In some embodiments, messages including USB instructions can be sent to the USB hub to perform various functions. For example, soft off messages can be sent to the modems instructing them to power down non-essential componentry, but continue to listen for messages on the data bus to power on/wake up at a later time.

Power supply 208 is configured to supply power to the various components (e.g., modems, USB hub, microcontroller, etc.) of RF Pack 200. In some embodiments, power supply 208 is a battery. In some embodiments, USB interface 204 can also be configured to supply power (e.g., supplied by host system when connected) to the RF Pack. However, the power available via a single USB port (2.5 W standard max), may not be sufficient to power more than one modem at a time. Thus, power supply 208 can be used so that sufficient power can be supplied for simultaneous operation of more than one modem. In some embodiments, all power to the components of RF Pack 200 is supplied via power supply 208, and power drawn via USB port 204 is used to top up or refill the charge of power supply 208. In some embodiments. DC jack 210 is used to quick charge power supply 208. In some embodiments, power is drawn via USB port 204, with power supply 208 switched in to supply additional power as needed. In some embodiments, monitoring components such as thermistors and gas gauge ICs are used to monitor the status of power supply 208, such as battery temperature, voltage, capacity, etc.

Microcontroller 206 is configured to monitor status information associated with the RF Pack, provide and control power to various elements/components included in RF Pack 200, provide reports, and receive instructions from a host system for controlling RF Pack 200.

In various embodiments, monitored status information includes battery status information (e.g., temperature, voltage, charge, etc.), signal strength/throughput information of modems, and any other appropriate status information. In some embodiments, microcontroller 206 displays the monitored status information via an onboard display, which will be described in more detail below.

In some embodiments, providing power to various elements/components of RF Pack 200 includes controlling power to individual modems. In the example shown, power to each of individual modems 210, 212, 214, and 216 is controlled via the modem's corresponding cutoff switch (222, 224, 226, 228), which is in turn controlled by microcontroller 206. In some embodiments, cutoff switches (222, 224, 226, and 228) are transistor-based switches used to provide a hard cutoff of power to modems. For example, microcontroller 206 can cut off power to a modem in the event that the modems enter an inoperable or error state. Microcontroller 206 can also return power to the modem (e.g., as a form of hard reset). In some embodiments, microcontroller 206 is configured to power on/off modems based on monitored status information. For example, microcontroller 206 can turn off a modem if its signal strength is very low or to conserve battery charge if the battery charge is low. In some embodiments, microcontroller 206 is configured to use GPS information (e.g., from GPS module included on circuit board). For example, if a user traveled to London, an event which is identified by the GPS module, a modem associated with a UK-based carrier can be powered on while modems associated with US-based carriers that would incur roaming charges are powered off. The GPS information can also be relayed to a host system for use by a software application installed on the host system.

In some embodiments, microcontroller 206 is also configured to manage the power up sequence of RF Pack 200 (e.g., when user turns on RF Pack via on/off switch (230) to provide power to RF Pack device elements (USB controller, modems, LEDs, GPS, SIM cards, etc.), which will be described in more detail below. In some embodiments, instructions for powering up RF Pack are provided via a host system (e.g., laptop running software application management tool) that RF Pack 200 is connected to. In some embodiments, microcontroller 206 includes logic to locally perform power up of RF Pack 200 independently of the host system. For example, microcontroller 206 can include logic to determine the signal strength associated with various wireless carriers, and attempt to establish data connections between modems and wireless carriers (e.g., connect to cellular towers provided by telecommunications status) without having to access the RF Pack via a host system.

In some embodiments, microcontroller 206 communicates with a host system via USB hub 202. Microcontroller can receive instructions from (e.g., commands from application installed on a host system to turn off a specific modem) or transmit information (e.g., monitored status information) to the host system. In some embodiments, appropriate supporting hardware and firmware are installed to allow for microcontroller 206 to directly communicate with the host system via USB (e.g., microcontroller 206 is recognized as a USB device connected to the hub). In some embodiments, microcontroller 207 communicates with a host system via an intermediary UART (universal asynchronous receiver/transmitter) to USB converter.

Figure 3:
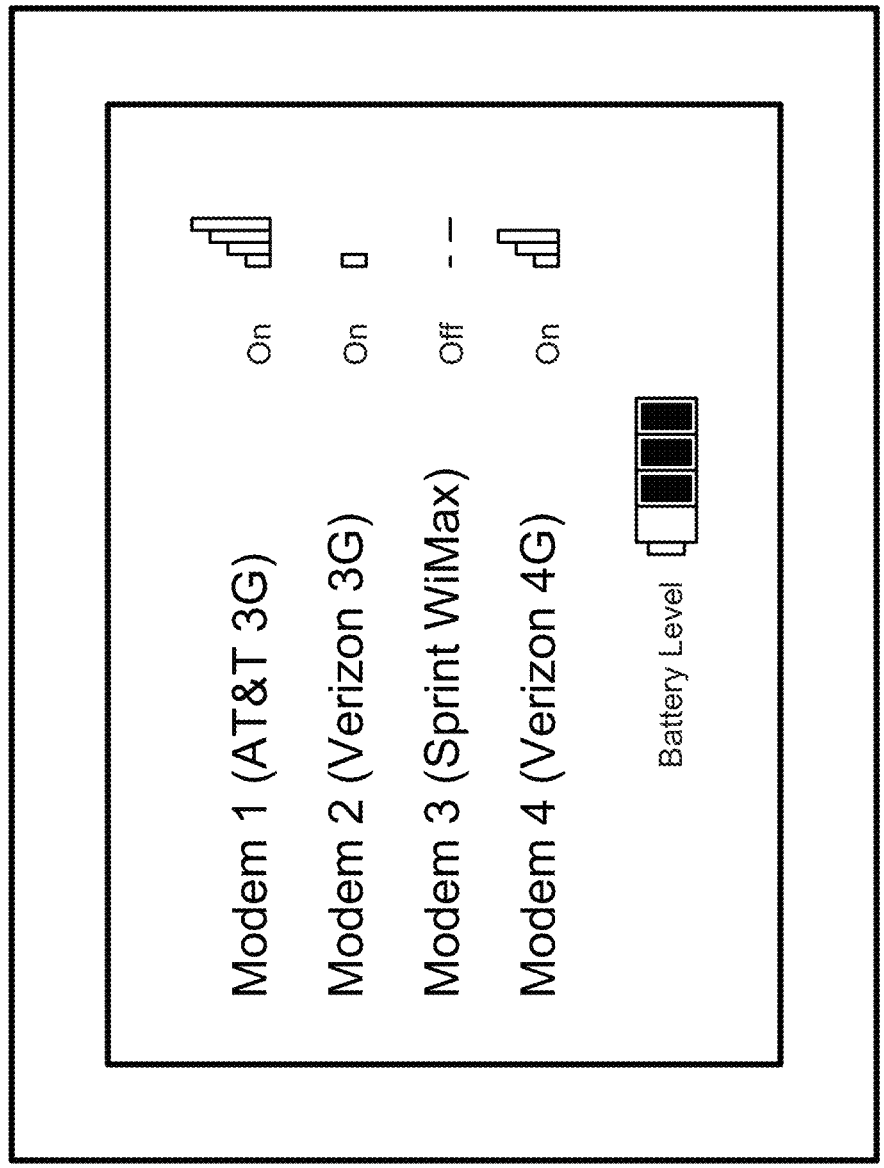
FIG. 3 is a diagram illustrating an embodiment of an RF Pack display.

FIG. 3 is a diagram illustrating an embodiment of an RF Pack display. In the example shown, various status information associated with the RF Pack is displayed, such as individual modem signal strength, on/off status, battery level, etc. In various embodiments, the display is a series of LEDs, an OLED display, an e-ink display, or any other appropriate display.

In various embodiments, information is displayed textually, graphically, via LED lights, or through any other appropriate representation.

In various embodiments, the displayed status information includes modem status information, battery status information, or any other appropriate information. In the example shown, for each modem, a textual representation of the on/off status of the modem is displayed. The on/off status information can also be represented using LEDs. For example, a green LED can be used to indicate on status and a red LED to indicate standby mode, while no LED indicates that the modem is off. In some embodiments, the carrier and wireless format associated with each modem is also displayed.

The signal strength of each modem can also be displayed. In the example shown, the signal strength is indicated using signal bars. LED lights indicating signal strength levels can also be used. The remaining battery charge of the RF Pack can also be displayed. In the example shown, a representation of a battery is displayed. LED lights can also be used to indicate the remaining battery charge level of the power supply of the RF Pack. By displaying status information via an on-board display, a user is able to view status information such as signal strength without having to connect the RF Pack to a host system to view the status information via a software application.

Figure 4:
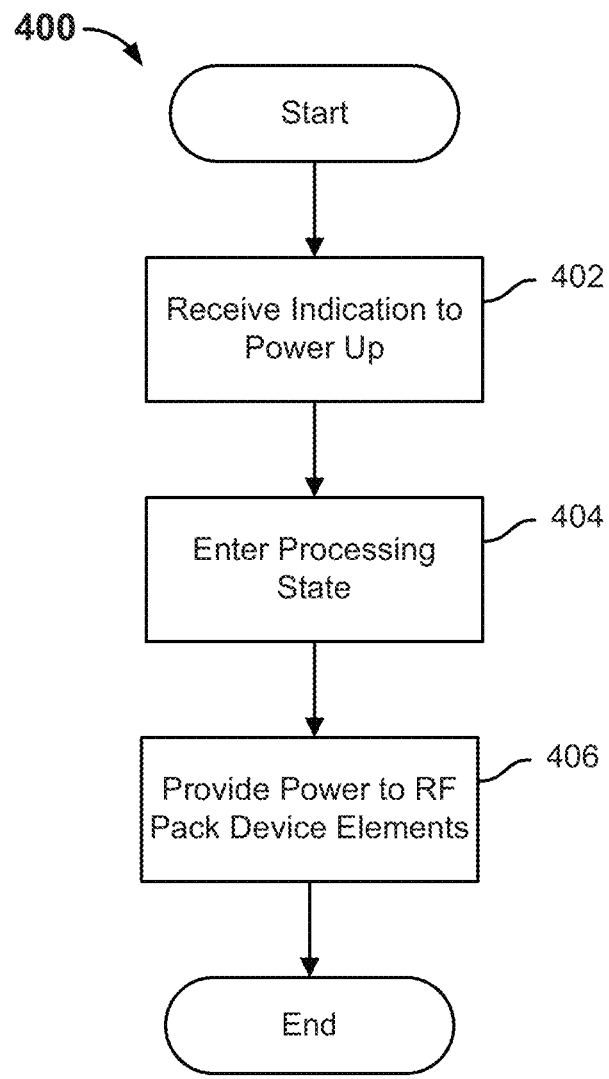
FIG. 4 is a flow diagram illustrating an embodiment of a process for powering up an RF Pack.

FIG. 4 is a flow diagram illustrating an embodiment of a process for powering up an RF Pack. In some embodiments, process 400 of FIG. 4 is executed by microcontroller 206 of FIG. 2. The process begins at 402 when an indication to power up is received. In various embodiments, the indication is received from a capacitive touch sensor, a mechanical switch, or any other appropriate mechanism when the RF Pack is turned on (e.g., via switch 230 of FIG. 2).

At 404, a processing state is entered. In some embodiments, the microcontroller begins in a low power state, and the received indication is used to signal the microcontroller to exit the low power state and begin powering up the RF Pack. For example, a signal may be sent to an interrupt line of the microcontroller.

At 406, power is provided to RF Pack device elements. In some embodiments, power to the RF Pack device elements is switched on/off by enabling/disabling a voltage regulator (e.g., DC-DC converter) using a microcontroller. The voltage regulator is used to convert a useable battery voltage range (e.g., 3.3V-4.2V) and/or 5V USB or DC power to a regulated voltage line (e.g., 3.3V line). The regulated line is used to provide power to the RF Pack device elements (e.g., USB controller IC chip, modems, LEDs, GPS, SIM cards, etc.).

In some embodiments, the microcontroller includes logic to locally determine whether to selectively power on individual components, such as individual modems (e.g., via switches 210, 224, 226, 228). In some embodiments, the determination of whether to power on a modem is based on a determination of the signal strength associated with the modems. For example, if the signal strength of the modem is determined to be low, then the modem is not powered on. In some embodiments, a modem can be powered on while radio hardware is turned off. In some embodiments, the microcontroller receives instructions (e.g., from a host system connected to the RF Pack) indicating whether to power up/down certain device elements of the RF Pack.

Figure 5:
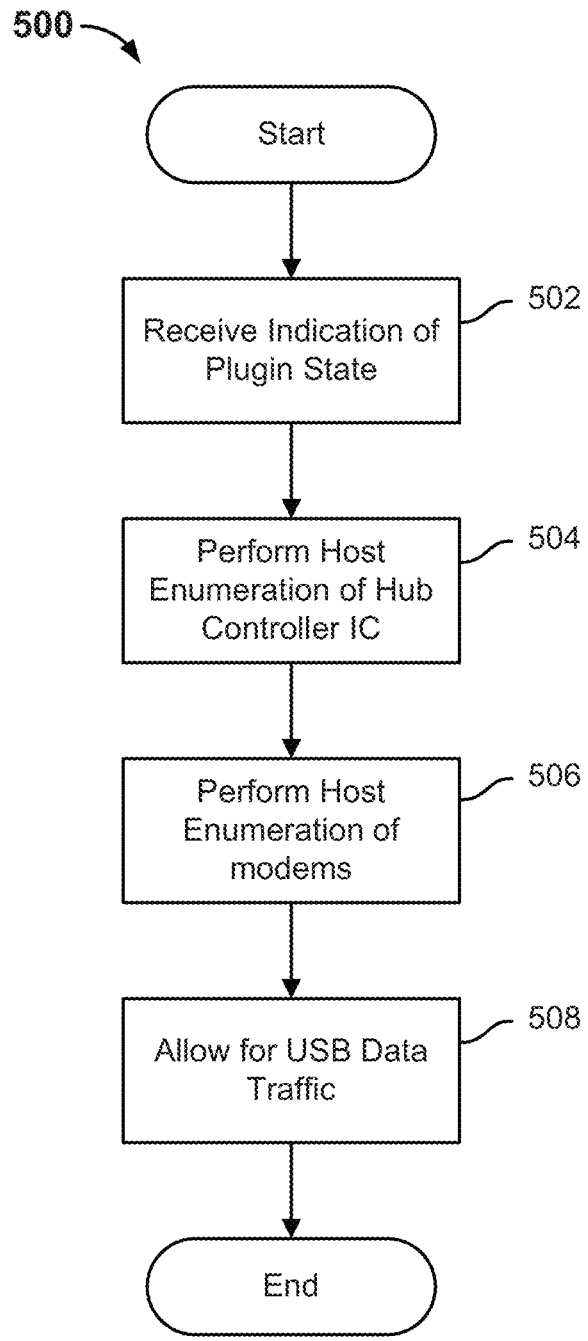
FIG. 5 is a flow diagram illustrating an embodiment of a process for USB data flow.

FIG. 5 is a flow diagram illustrating an embodiment of a process for USB data flow. In some embodiments, process 500 of FIG. 5 is executed by a host system, such as host system 102. The process begins at 502 when an indication of a plugin state is received. For example, an indication of a plugin state can be received in response to an RF Pack being plugged into the USB host port of a laptop.

At 504, host enumeration of the USB hub controller IC (e.g., USB hub controller of USB hub 204 of FIG. 2) is performed. Enumeration of the USB hub controller IC is performed so that the host system can communicate with the USB hub and the devices connected to the hub. At 506, host enumeration of modems is performed. For example, each modem device connected to USB hub 202 is enumerated so that the modems can be recognized and communicated with by the host system. In some embodiments, other devices connected to the USB hub, such as microcontroller (206), GPS module, etc. are also enumerated so that they are recognized as USB devices by the host system. For example, the microcontroller can be enumerated so that a developer can debug and program the microcontroller via the host system. The host system can have device drivers installed that allow the host system to recognize and communicate with the enumerated devices.

At 508, USB data traffic is allowed to flow between the host system and the enumerated devices. In various embodiments, USB data traffic includes broadband data provided by the communications links accessed by the modems, status information associated with the RF Pack, messages and instructions passed between the RF Pack and host system, etc.

Figure 6:
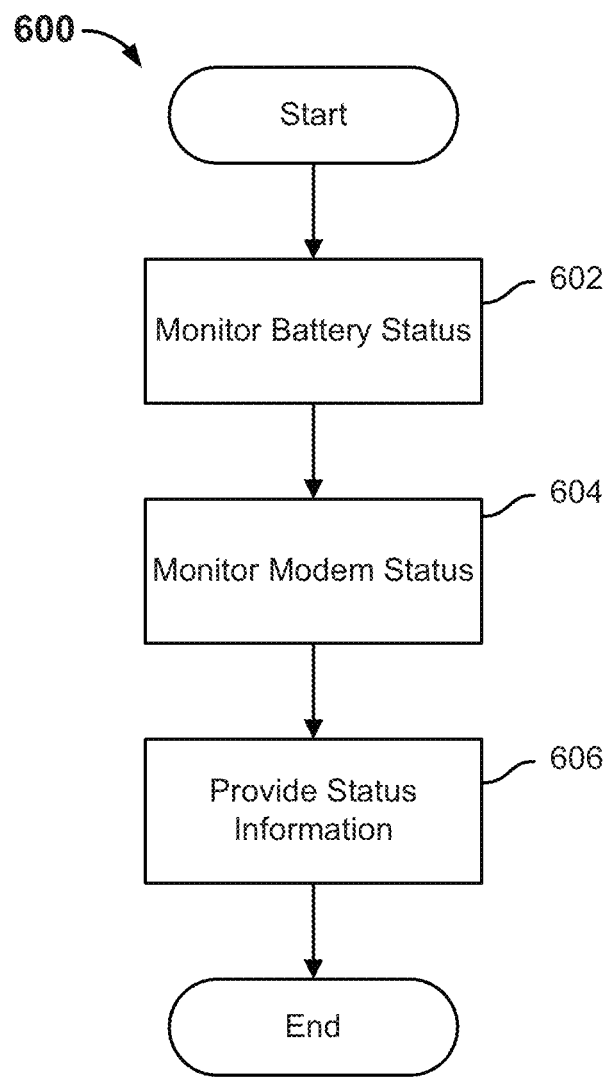
FIG. 6 is a flow diagram illustrating an embodiment of a process for monitoring an RF Pack.

FIG. 6 is a flow diagram illustrating an embodiment of a process for monitoring an RF Pack. In some embodiments, process 600 is executed by microcontroller 206 of FIG. 2.

The process begins at 602 when battery status is monitored. In various embodiments, the temperature of a battery (e.g., power supply 208 of FIG. 2) is monitored. The temperature of the battery can be monitored via a temperature sensor (e.g., thermistor). In some embodiments, an alert is provided in the event that the battery temperature criteria are met. For example, in the event that the battery temperature exceeds a safe operating threshold temperature, an alert is provided to a host system notifying of the unsafe temperature. In some embodiments, the RF Pack includes a small speaker that can emit a buzzer alert in the event of the temperature threshold being exceeded. In some embodiments, devices connected to the battery are powered down to prevent damage to the RF Pack.

In some embodiments, the voltage of the battery is monitored via a voltage sensor (e.g., gas gauge IC). As with battery temperature, an alert or notification can be provided in the event that the battery voltage criteria are met (e.g., monitored voltage exceeds a safe operating threshold voltage). Connection of devices to the battery line can be cut to prevent further damage to the battery. In some embodiments, the microcontroller cuts power to the entire RF Pack and enters a low powered state.

In some embodiments, the charge/remaining capacity of the battery is monitored via a capacity sensor (e.g., gas gauge IC). If the remaining charge drops below a voltage threshold, a notification/alert can be sent to a host system as well.

At 604, modem status is monitored. For example, the signal strength, data rate, or any other appropriate status information of each of the modems is monitored. Status information of other devices can also be monitored. For example, GPS location information can be monitored.

At 606, the monitored status information is provided. In some embodiments, a status report is generated based on the monitored status information and transmitted to a host system. In some embodiments, the generated status report includes error warning/log information. The provided monitored status information can be used by a software application installed on the software system to evaluate the performance of the RF Pack. For example, based on the status information, messages may be transmitted to the RF Pack instructing the two modems with the weakest signal strength to power down (e.g., via switches controlled by microcontroller 206) to conserve battery charge, as the remaining charge of the battery is close to the threshold. In some embodiments, the microcontroller includes logic to locally determine the operation of various devices based on the monitored status information.

Figure 7:
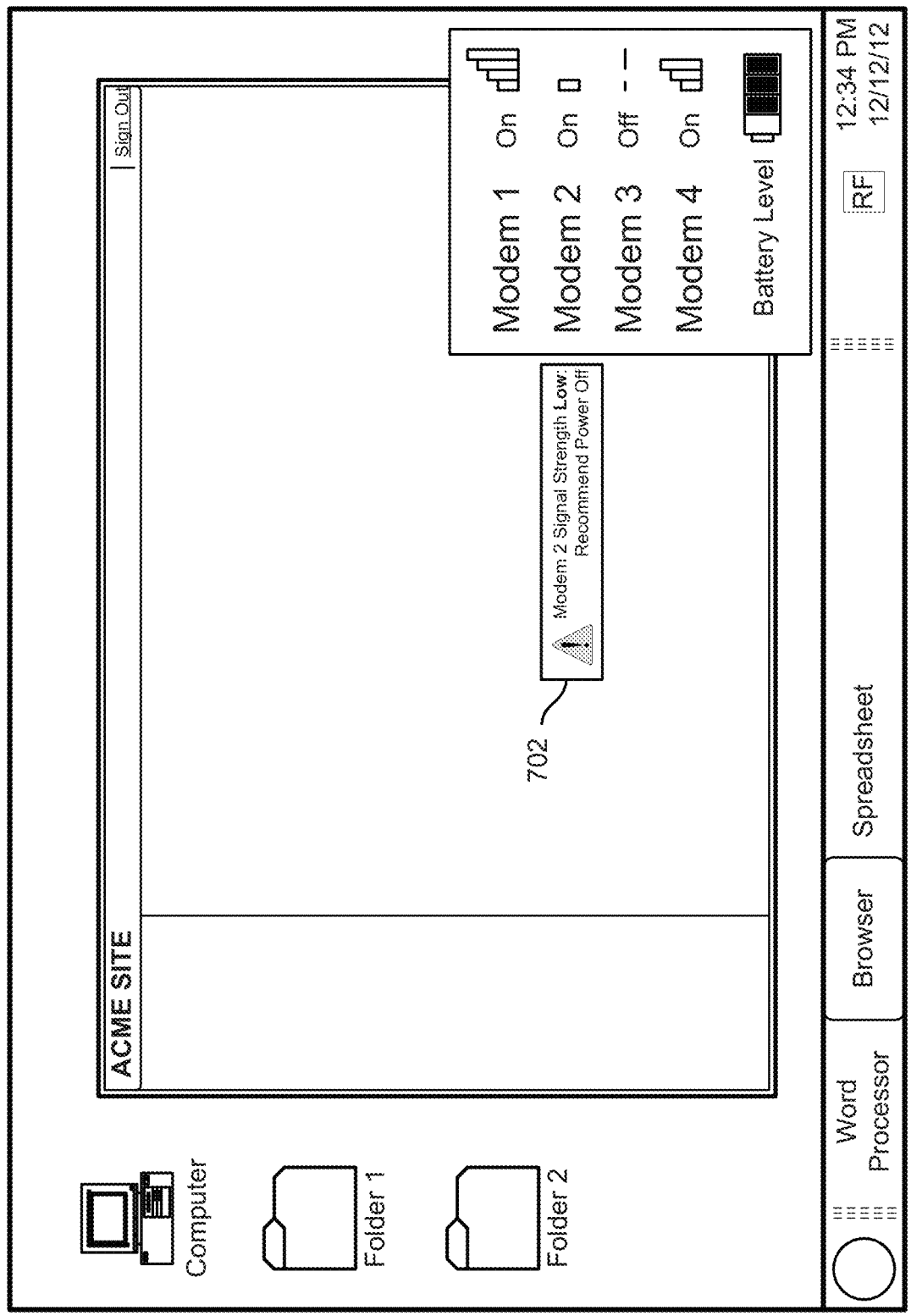
FIG. 7 is a diagram illustrating an embodiment of an interface for interacting with an RF Pack.

FIG. 7 is a diagram illustrating an embodiment of an interface for interacting with an RF Pack. In some embodiments, interface 700 is displayed on a host computer system such as host laptop 102 of FIG. 1. In the example shown, an application service used to communicate with the RF Pack is run in a system tray and continually monitors the performance of the RF Pack. In some embodiments, an application program is installed on the computer system that allows a user to interact with and monitor the performance of the RF Pack upon opening.

In the example shown, various status information is displayed, such as the signal strength and on/off status of each modem as well as the battery level of power supply of the battery back. In some embodiments, warning messages are also displayed (e.g., in the event that temperature/voltage/remaining charge exceed/drop below threshold). In the example shown, warning 702 indicates that the signal strength of modem 2 is low and provides a recommendation to power off the modem. In some embodiments, interface 700 includes selection options for operating the RF Pack and its various components. For example, interface 700 can include radio buttons or other selection options for selectively turning on/off individual components (e.g., modems, GPS modules, etc.) or for turning off the RF Pack altogether. The RF Pack and its various components can also be instructed to enter low power states or to be woken up via the interface. In various embodiments, other status information, such as data rate, GPS information, data usage (e.g., per modem or aggregate), etc. are displayed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A multi-modem device including:
a housing;
a plurality of modems included within the housing, wherein the modems send and receive data along a common data bus, and wherein at least a portion of the modems in the plurality of modems are associated with different telecommunications carriers; and
an interface configured to facilitate communications between the plurality of modems and a host computing device;
wherein the plurality of modems is made available to the host computing device to provide one or more communication links to the host computing device at least in part according to configuration modes including:
(1) a first mode wherein a modem included in the plurality of modems is selected to be operated individually; and
(2) a second mode wherein two or more modems in the plurality of modems are selected to be operated in parallel and communicate data simultaneously such that connectivity provided by the selected two or more modems is aggregated to provide an aggregate single data connection that has an available bandwidth that exceeds the bandwidth that would be available in the event that only one modem in the selected two or more modems was selected to be operated.

2. The device of claim 1 wherein the modems include cellular modems.

3. The device of claim 1, further including a plurality of subscriber identity module card sockets.

4. The device of claim 1, further including a microcontroller.

5. The device of claim 1, wherein the microcontroller monitors status information associated with the multi-modem device.

6. The device of claim 4, wherein the microcontroller monitors signal strength of the modems.

7. The device of claim 4, wherein the microcontroller monitors power status of a battery.

8. The device of claim 4, wherein the microcontroller controls power to the modems.

9. The device of claim 8, further including a plurality of switches used to power off the modems, and wherein the switches are controlled by the microcontroller.

10. The device of claim 1, wherein the data bus includes a universal serial bus hub.

11. The device of claim 10, wherein the universal serial bus hub and the plurality of modems are mounted on a single circuit board.

12. The device of claim 1, further including a power supply.

13. The device of claim 12, wherein the power supply includes a battery.

14. The device of claim 12, further including a quick charger used to charge the power supply.

15. The device of claim 1, wherein at least a portion of the telecommunications carriers are based in different geographical locations.

16. The device of claim 1, wherein the portion of the plurality comprises all of the modems in the plurality of modems.

17. The device of claim 1, wherein at least a portion of the modems in the plurality of modems are associated with different formats.

18. A method, comprising:
   receiving, via an interface configured to facilitate communications between a plurality of modems included within a housing and a host computing device, an indication of an operating configuration mode; and;
   configuring a portion of the plurality of modems to operate according to the indicated operating configuration mode to provide one or more communication links to the host computing device, wherein at least a portion of the modems in the plurality of modems are associated with different telecommunications carriers;
   wherein the indicated operating configuration mode comprises a configuration mode included in a set of configuration modes comprising:
   (1) a first mode wherein a modem included in the plurality of modems is selected to be operated individually; and
   (2) a second mode wherein two or more modems in the plurality of modems are selected to be operated in parallel and communicate data simultaneously such that connectivity provided by the selected two or more modems is aggregated to provide an aggregate single data connection that has an available bandwidth that exceeds the bandwidth that would be available in the event that only one modem in the selected two or more modems was selected to be operated.

19. The method of claim 18, wherein configuring the plurality of modems to operate according to the indicated operating configuration mode causes a switch in configuration modes.

\* \* \* \* \*